E. C. ALBREE.
ACCOUNTING SYSTEM.
APPLICATION FILED JAN. 11, 1908.

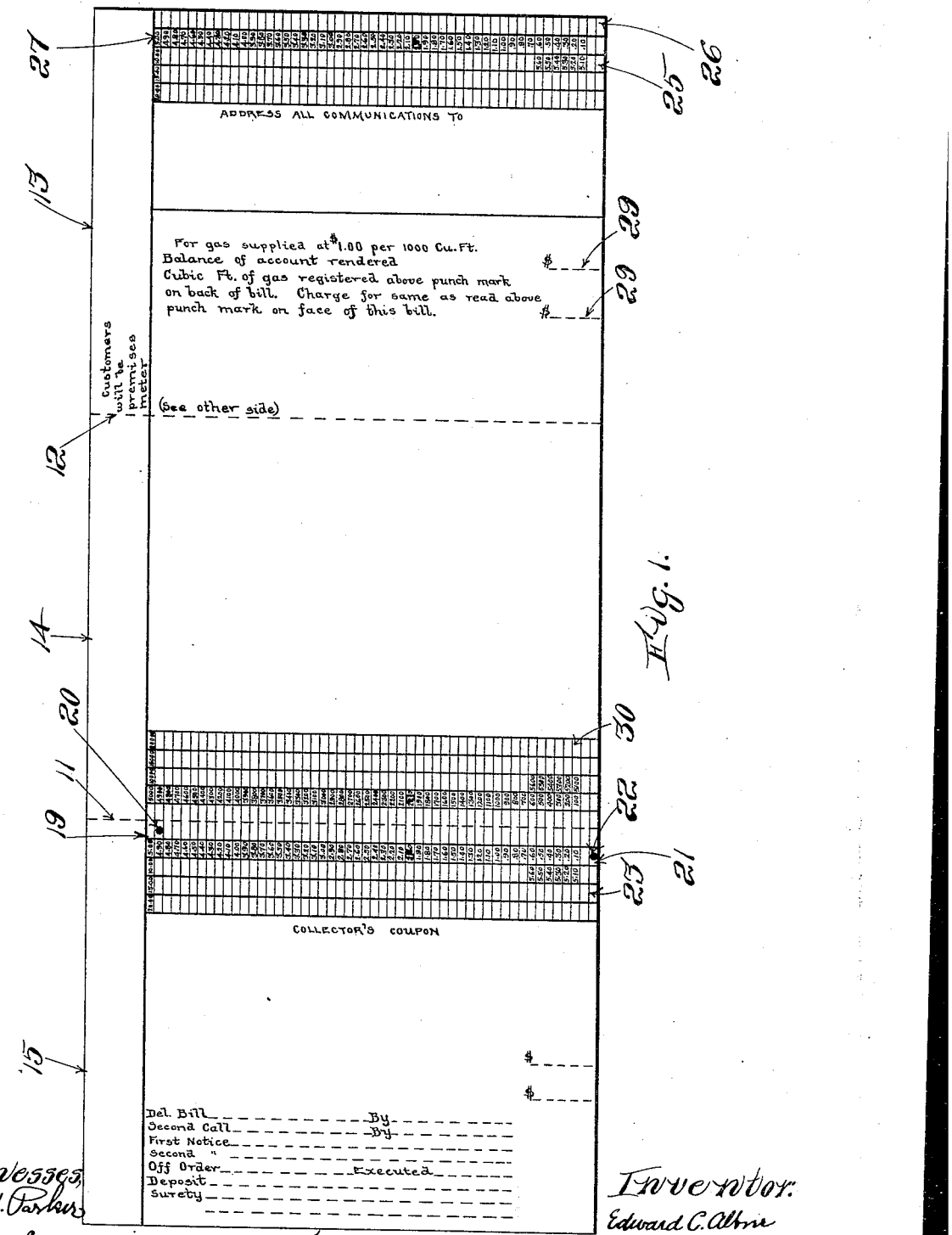

1,118,171.

Patented Nov. 24, 1914.
4 SHEETS—SHEET 2.

Witnesses,
John H. Parker
Jessie E. Morrison

Inventor:
Edward C. Albree
by Macleod, Calver, Copeland & Dike
Attorneys.

E. C. ALBREE.
ACCOUNTING SYSTEM.
APPLICATION FILED JAN. 11, 1908.

1,118,171.

Patented Nov. 24, 1914.
4 SHEETS—SHEET 3.

UNITED STATES PATENT OFFICE.

EDWARD C. ALBREE, OF SWAMPSCOTT, MASSACHUSETTS, ASSIGNOR TO ALBREE SELF FIGURING SYSTEM COMPANY, OF BOSTON, MASSACHUSETTS, A CORPORATION OF MASSACHUSETTS.

ACCOUNTING SYSTEM.

1,118,171.      Specification of Letters Patent.      Patented Nov. 24, 1914.

Application filed January 11, 1908. Serial No. 410,334.

*To all whom it may concern:*

Be it known that I, EDWARD C. ALBREE, a citizen of the United States, residing at Swampscott, county of Essex, State of Massachusetts, have invented a certain new and useful Improvement in Accounting Systems, of which the following is a specification, reference being had therein to the accompanying drawings.

My present invention has for its object a bill which may be employed by gas, electric-light, water and companies dealing in similar commodities which shall lessen to the largest possible degree the expense attendant upon the collection of the accounts due it from its consumers.

My invention is particularly adapted for use where the commodity is measured at the consumer's by a meter which is read from time to time by an employee of the company, the bills being based upon the difference in the successive readings of the meter.

One of the methods now employed consists substantially in the following series of steps. When the meter is installed at the consumer's, a card, or ticket is left with it upon which is recorded the reading of the meter at the time when it is installed. Once a month an employee of the company, known as a "reader", visits the meter, takes the reading of the meter and records it upon the meter card and on a card which he returns to the office. At the office of the company, the difference between the two readings is found, and this is multiplied by the price per unit, thus determining the amount which the consumer owes the company for the amount used during that period of time. To determine the difference in readings, it is necessary to find the card bearing the previous reading in order that the amount shown thereon may be subtracted from the reading on the last card. This step involves a large amount of clerical labor when the number of accounts is large. A bill is then made out for the amount owed and mailed to the consumer. It is also customary to make out certain cards or slips which are substantially duplicates of the bill and which may be filed in the collection department and auditor's or cashier's department, and by means of which account may be readily kept of consumers who are delinquent in paying their bills. The duplicate kept in the collection department is known commonly as a collection coupon and serves to keep a record of the various steps which have been taken toward the collection of the account.

My invention affords means by which the bills for the consumers and the duplicates for the office may be automatically made out by the meter reader at the time when he reads the meter and without requiring the reader to perform any calculation. The reader may then either collect the bill on the spot, or may leave the bill, in either of which cases the entire expense for postage is saved; also the clerical labor heretofore required to find the card bearing the previous reading and in subtracting the first reading from the second reading and multiplying the difference by the price per unit. The system embodying my invention is equally efficient in all respects to the systems now in use, but requires the expenditure of far less labor.

The invention is embodied in cards, slips or envelops, ruled and printed in a peculiar manner now to be described and used in combination with each other, two or more different cards, slips, or envelops being superposed and punched according to the reading of the meter.

In the following description, the invention is described as adapted for use by a gas company for gas at the price of one dollar per thousand feet. It is obvious that it may readily be employed by companies dealing in electricity, or water or other similar commodities.

The invention will be fully understood from the following description taken in connection with the accompanying drawings, and the novel features thereof will be pointed out and clearly defined in the claims at the close of the specification.

In the drawings,—Figure 1 is a view of the front face of a bill embodying my invention, said bill comprising three parts, namely the consumer's bill and receipt, cashier's coupon and collection coupon. Fig. 2 is a view of the back face thereof. Fig. 3 is a view of the meter card, said meter card being blank on the back side. Fig. 4 is a view of the reader's envelop, the meter card being inserted therein. Fig. 5 is a view of the bill folded. Fig. 6 is a view of the reader's envelop containing the meter card superposed upon the bill.

Referring to the drawings, and more particularly to Figs. 1, 2 and 5: there is shown in these figures what may be termed a consumer's bill. This bill consists of a sheet of paper or other suitable material which may be folded along the lines 11 and 12 into the shape shown in Fig. 5 to form three detachable parts, the first of which, 13, is the consumer's bill, the middle portion, 14, being the cashier's coupon, and the part, 15, being the collector's coupon. A meter card 16 is shown in Fig. 3 and is divided into columns of spaces 17 of uniform size, and all the cards employed together are also provided with spaces of the same size and similarly arranged, so that when the cards are superposed, the dividing lines between the said spaces on the different cards register exactly with each other. The spaces 17 on the meter card shown in Fig. 3 are numbered beginning with the second space in the lower right hand corner with numbers which indicate the number of units of the commodity,—in this case cubic feet of gas. Thus, the second space is given the number 100 to indicate 100 cubic feet; the third space, 200; the fourth space, 300 and so on. These numbers are placed in the space next above the space to which they refer in order that the numerals may not be obliterated by the punch mark. After a space has been punched, the numeral lying in the space next above it is the one which is read. In the card shown in Fig. 3 the numerals run up to 90,000 so that a meter card may be used for a consumption of gas to the amount of 90,000 cubic feet. At the top of the card spaces for various information may be conveniently placed, such for instance as the name and address of the consumer, instructions for reading the meter, description of the meter, etc.

The meter card 16 is used in connection with a reader's card 18, see Fig. 4, arranged for convenience in the form of an envelop open on two sides, which is ruled and numbered exactly the same as the meter card 16, see Fig. 3, previously described, except that the numbers are all placed in the spaces to which they apply instead of in the space next above the spaces to which they apply, as in the reader's card. Thus, the numeral 100 is placed in the space which occupies the lower right hand corner.

The bill, reference to which has heretofore been made, will now be described in detail. That portion of the bill known as the collector's coupon and designated 15, (see particularly Figs. 1, 2 and 5) is ruled in columns of spaces 23 the same as the meter card (see Fig. 3) and reader's card (see Fig. 4) previously described, but the first column 19 of said spaces is left blank except for a small black dot 20, called the "upper starting dot" in the second space from the top of the said right hand column 19. In the lowest space in the second column 21 of spaces is a similar dot 22, known as the "lower starting dot". The space next above the said lower starting dot is blank, and the second space above contains the figures .10 which is the price per 100 feet of gas, indicating that if the second space from the bottom of this column is punched, $.10 worth of gas has been used. The fourth space from the bottom contains the numeral 20 and the remaining spaces on the card are consecutively numbered, the numerals being multiples of ten of the numbers of the spaces to which they apply, counted from the space next above the lower starting dot. On the reverse side of the said collector's coupon 15 and registering with it are spaces 24 of the same size as those 23 found upon the front, but these spaces contain numbers indicating the amount of gas used, the said numbers being placed in the spaces next above those to which they apply in order that the amount of gas used may be read above the punch mark. The said spaces on the front and back sides of the collector's coupon may extend over the whole or a part only of its area as may be desired according to the amount of gas which is likely to be used by the class of consumers for whom these bills are employed. Any remaining space on the card may be used for recording information regarding any efforts which may have been made to collect the bill; as, for instance, the number of times the collector has called, the order to shut off the gas, etc.

It will be seen that the collector's coupon, when properly punched, and filled out and filed in the collector's office, gives to the collector all the information necessary as to the condition of the account of the customer.

The part 13 of the sheet shown in Figs. 1, 2 and 5, forms the customer's bill and has on its front face, that is the face shown in Fig. 1, columns of spaces 25 of the same size and form as those on the other parts of the bill and on the meter (see Fig. 3) and reader's cards (see Fig. 4). Of these columns of spaces, the right hand column 26 is left blank, and the second column 27 is provided with numerals beginning with the third space from the bottom, the said numerals being consecutively .10, .20, .30, etc., indicating the value in money of the gas used. On the reverse side, see Fig. 2, and registering with the columns of spaces on the front are other columns of spaces 28 containing numerals indicating the number of cubic feet of gas used. The blank spaces on the customer's bill may be employed for such information as it is desirable that the customer should have, such for instance as directions for reading the meter, the telephone numbers of the gas company, modes of making payments, etc. There are also two spaces 29 for the total charges so that the customer may not be obliged to examine the columns of spaces to determine the amount due on the bill.

The middle portion 14 of the sheet shown in Figs. 1, 2 and 5 is called the cashier's coupon and contains on its front face columns of spaces 30, see Fig. 1, indicating the number of cubic feet of gas used and on the back, see Fig. 2, other columns of spaces 31 for recording the value of the gas used. Spaces 32 may also be left for the amount paid and the balance remaining unpaid on the bill.

When the sheet is folded along the two lines 11 and 12 in the manner shown in Fig. 5 with the front face of the collector's coupon outermost, the columns of spaces on each of the three portions of the bill register with each other so that if one of the spaces is punched, a record will be made on each of the three portions. Thus, the front face of the collector's coupon will show the amount owed for gas and the back face will show the amount of gas consumed; the back face of the cashier's coupon will show the amount owed and the front face the amount of gas consumed; the front face of the customer's bill shows the amount owed and the back face shows the amount of gas consumed, and each of these pieces of information will correspond exactly with each other so that the same information may be obtained from each of the three pieces.

Having described the general structure of the reader's card, the meter card and the bill, I will now explain the manner in which these devices are employed in combination with each other to obtain the results desired. When the meter is installed, the meter card shown in Fig. 3 is placed inside the reader's card, as shown in Fig. 4, and the two are punched at the point at which the meter then stands, or if the meter is set back to a zero reading, the cards are not punched. In Figs. 3 and 4, the two cards 16 and 18 are shown as punched at 33 and 34, respectively, showing that 2600 feet of gas had previously been registered by the meter. It will be seen that the number 2600 on card 18, Fig. 4, has been punched out by the punch mark 34, while on card 16, Fig. 3, the punch mark 33 is below the number 2600. By arranging the cards in this way, the reader is enabled to punch out the number corresponding with the meter reading, but this number is not obliterated on the other cards. Similar arrangements are made in other parts of the cards. A punch mark of peculiar form is also conveniently used to indicate the original reading of the meter. In the present case it is shown as circular. The meter card 16 is then hung on the meter or left with the consumer and the reader's card 18 returned to the office of the gas company. At the end of the month, the meter reader is given the reader's card 18 and a bill like that shown in Figs. 1 and 2 folded to the form shown in Fig. 5 for each of the consumers whom he is to visit. On arriving at the meter, he takes the meter card 16 and places it inside the reader's card 18, as shown in Fig. 4, and it will be seen that the round punch marks 33 and 34 already on these two cards will coincide. He then takes the folded bill and places the reader's card 18, having within it the meter card 16, upon the folded bill with the punch mark 34 in registration with one of the starting dots 20 or 22 and punches all three cards at the point indicated by the reading of the meter at that time. The cards in their superposed position are shown in Fig. 6 and the punch mark thus made is indicated by the numeral 35. The lower starting dot 22 is used when the number to be punched lies above the last previous punch mark, while the upper starting dot 20 is employed when the number to be punched lies below the last previous punch mark. In the drawings the number 4700 is punched out as shown, thereby making a simultaneous record on the three parts of the bill, on the meter card 16 and on the reader's card 18. This record shows that the consumer has used during the month the amount of gas indicated by the spaces between the two punch marks. In this case it is 2100 feet. The parts of the bill also show that the value of the gas is $2.10. In practice, it is found convenient for the reader to use a different punch for each month so that the punch marks themselves shall show what month they are for. This may be done by using a punch mark in the form of a letter or number. In the present case I have shown the punch mark in the form of an F to indicate the punch mark was made in February. The reader then leaves the meter card 16 at the meter, detaches the collector's coupon 15 from the remainder of the sheet and leaves the cashier's coupon 14 and consumer's bill 15 with the consumer, taking with him to the office the collector's coupon 15 and the reader's card 18. If the consumer desires to pay the reader on the spot for the gas consumed, the reader enters the amount in the space 29 on the front side of the consumer's bill 13, signs the receipt and gives it to the consumer, returning the money and the cashier's coupon 14 to the cashier. In case the consumer has not paid the bill, the collector's coupon 15 is filed in the collector's office and is used as a memorandum for making out subsequent bills and for use in collecting the account. When the account is paid the consumer receives the consumer's bill 13, the cashier's coupon 14 being detached by the cashier who receives the money and forming his voucher therefor.

The method of procedure for subsequent months is the same. The reader takes a new bill for each consumer each month, but the reader's and meter cards serve for several months, one punch mark being added each month to the record on the meter and reader's cards in accordance with the increase in the reading of the meter.

It is sometimes desirable for the collector's office to have a record of the previous charge made the customers as well as that returned by the meter reader. In that case, the meter reader may be instructed to place the collector's coupon 15 of the bill inside the reader's card and make a pencil mark such as that shown at 36 (see Fig. 5) through the last punch mark 35.

It will be seen that cards embodying my invention enable the gas company to have its readers deliver the bills directly to the consumers, thus doing away with the expense for envelops and postage which has heretofore been required where the bills have been mailed from the office. The invention also does away with the necessity of having a large number of clerks whose business it is to make up the bills by subtracting the first reading from the last reading and multiplying the difference by the price per thousand cubic feet. All of this is done automatically when the reader punches the cards as has been described. The system of duplicate records makes it impossible, it is believed, for the reader by collusion with the consumer to cheat the gas company by under reading the meter. The consumer is also given fuller information as to his consumption of gas than has heretofore been possible, as he may readily compare the various punch marks on his meter card, thereby enabling him to determine whether his consumption of gas has been substantially regular or not.

I claim as my invention:

1. The improved means for computing the value of a commodity measured by a meter and simultaneously making out a bill therefor which consists of a meter card divided into spaces of uniform size and having at regular intervals in the said spaces numbers which are possible readings of the meter, and a bill similarly divided into spaces of uniform size located to register with the spaces on the said meter card, when the bill and the meter card are superposed, said spaces on the bill having numbers therein which are the numbers in the similarly situated spaces of the said meter card multiplied by a constant which is the price per unit of the commodity.

2. The improved means for computing the value of a commodity and simultaneously making out a bill therefor which consists in a card divided into spaces of uniform size arranged in columns of equal height, and a bill having on the front face thereof spaces arranged like those on the said card and registering therewith when the bill and the card are superposed, said card and the front face of said bill being provided with like numbers in the said spaces, and on the back face of said bill spaces registering with those on the front face and having therein numbers which are multiples of those in the similarly situated spaces on the said card.

3. The improved means for computing the value of a commodity and simultaneously making out a bill therefor which consists in a card divided into spaces of uniform size arranged in columns of equal height and a bill having on the front face thereof spaces arranged like those on the said card and registering therewith when the bill and the card are superposed, said card and the front face of said bill being provided with like numbers in the said spaces, said numbers forming an arithmetic series, and on the back face of the said bill, spaces registering with those on the front face and having numbers applied thereto which are multiples of those in the similarly situated spaces on the said card and on the said front face of the bill, said numbers on the back face of the bill also forming an arithmetic series.

4. The improved means for computing the value of a commodity and simultaneously making out a bill therefor, which consists in a card divided into spaces of uniform size arranged in columns of equal height, and of a bill folded to form a plurality of parts or sections each of which has upon one face thereof spaces arranged like those on the said card and registering therewith, when the bill in folded form and the said card are superposed, said card and said face of each of said sections being provided with like numbers in the said spaces, and on the other face of each of said sections spaces registering with those on the opposite faces and having therein numbers which are multiples of those in the similarly situated spaces on the said card.

5. The improved means for computing the value of a commodity and simultaneously making out a bill therefor which consists in a meter card divided into spaces of uniform size arranged in columns of equal height and having numbers at regular intervals on the said spaces, and of a bill consisting of a card folded into a bill proper, a cashier's coupon and a collector's coupon, each face of each of said parts of the bill being divided into spaces registering with the spaces on said meter card when the bill in folded form and the said card are superposed, the front face of the cashier's coupon and the back face of the bill proper and of the collector's coupon being provided with numbers in the spaces which are the same as those on the meter card and the back face of the cashier's coupon and the front face of the bill proper and of the collector's coupon having numbers in the spaces thereon which are multiples of those in the similarly situated spaces on the said card.

6. The improved means for computing the value of a commodity and simultaneously making out a bill therefor which consists in a folded card having thereon a form for a bill comprising spaces and legends appropriately designating said spaces to form a bill, said card also being provided with a plurality of fields marked off into spaces of uniform size arranged in columns of equal height, said fields registering with each other, when the card is folded one of said fields having numbers forming an arithmetic series in the spaces thereof and another of said fields having numbers in its said spaces, each of said numbers being the product of the number in the similarly situated space in the first field and a constant and a second card marked off into spaces of uniform size arranged in columns of equal height adapted to register with the spaces of the fields on the folded card when the folded card and the other card are superposed, and having the same numbers in the said spaces as are in the similarly situated spaces of the first mentioned field.

7. In an accounting system, a folded card having thereon a form provided with spaces and with legends appropriately designating said spaces to form a bill, said card also being provided with a plurality of fields marked off into spaces of uniform size arranged in columns of equal height, said fields registering with each other when the card is folded, the spaces of one of said fields containing numbers forming an arithmetical series and the spaces of another field likewise containing numbers, each of which is a multiple of the number of the space with which it registers in the first mentioned field when the bill is folded, the other factor of the multiple for all the numbers of the second mentioned field being the same.

8. The improved means for computing the value of a commodity and simultaneously making out a bill therefor, which consists in a folded card having thereon a form provided with spaces and with legends appropriately designating said spaces to form a bill, said card also being provided with a plurality of fields divided into spaces of uniform size arranged in columns of equal height, said fields registering with each other when the card is folded, one of said fields having numbers forming an arithmetical series in the spaces thereof, and another of said fields having numbers in its said spaces which are the numbers in similarly situated spaces of the first mentioned field multiplied by a constant, and a second card divided into spaces of uniform size arranged in columns of equal height adapted to register with the spaces of the fields on the first mentioned card when the first mentioned card in folded form and the second mentioned card are superposed and having the same numbers in the said spaces as are in similarly situated spaces of the first mentioned field.

9. The improved means for computing the value of a commodity and simultaneously making out a bill therefor which consists in a card folded into three parts, there being on the part at one end of the card a form provided with spaces and with legends appropriately designating said spaces to form a bill, said card also being provided with three fields, one on each of said parts marked off into spaces of uniform size arranged in columns of equal height, said fields registering with each other when the card is folded, the spaces of the field on the part bearing the bill form containing numbers forming an arithmetical series, and the spaces of the field on the part at the other end of the card containing the same numbers, and the spaces of the field on the middle part of the card likewise containing numbers each of which is a multiple of the number in the space with which it registers in the two first mentioned fields when the bill is folded, the other factor of the multiple for all the numbers of the last mentioned field being the same.

10. The improved means for computing the value of a commodity and simultaneously making out a bill therefor, which consists in a folded card having thereon a form provided with spaces and with legends appropriately designating said spaces to form a bill, said card also being provided with a plurality of fields divided into spaces of uniform size arranged in columns of equal height, said fields registering with each other when the card is folded, one of said fields having numbers forming an arithmetical series in the spaces thereof, and another of said fields having numbers in its said spaces which are the numbers in the spaces of the first mentioned field multiplied by a constant, and a second card made in the form of an envelop open on two sides having a face thereof divided into spaces of uniform size arranged in columns of equal height adapted to register with the spaces of the fields on the first mentioned card and having the same numbers in the said spaces as are in the spaces of the first mentioned field.

In testimony whereof I affix my signature, in presence of two witnesses.

EDWARD C. ALBREE.

Witnesses:
GEORGE P. DIKE,
ALICE H. MORRISON.

Copies of this patent may be obtained for five cents each, by addressing the "Commissioner of Patents, Washington, D. C."